(12) United States Patent
Wang et al.

(10) Patent No.: US 10,479,445 B2
(45) Date of Patent: Nov. 19, 2019

(54) SMART CRANK CONTROL FOR E-BIKE

(71) Applicant: PalTorc, Inc., Milpitas, CA (US)

(72) Inventors: Jyh-Ping Johnny Wang, Milpitas, CA (US); Steve Chih-Ching Chou, Milpitas, CA (US); Dann Wang, Milpitas, CA (US)

(73) Assignee: PALTORC, Inc., Milpitas, CA (US)

( * ) Notice: Subject to any disclaimer, the term of this patent is extended or adjusted under 35 U.S.C. 154(b) by 166 days.

(21) Appl. No.: 15/814,364

(22) Filed: Nov. 15, 2017

(65) Prior Publication Data

US 2019/0100274 A1    Apr. 4, 2019

Related U.S. Application Data

(60) Provisional application No. 62/567,391, filed on Oct. 3, 2017.

(51) Int. Cl.
| | | |
|---|---|---|
| *B62M 6/50* | (2010.01) | |
| *B62M 6/55* | (2010.01) | |
| *B60L 15/20* | (2006.01) | |
| *B60K 31/02* | (2006.01) | |
| *F16C 3/06* | (2006.01) | |
| *H01R 39/08* | (2006.01) | |

(52) U.S. Cl.
CPC ............ *B62M 6/50* (2013.01); *B60K 31/02* (2013.01); *B60L 15/20* (2013.01); *B62M 6/55* (2013.01); *B60L 2200/12* (2013.01); *B60L 2240/421* (2013.01); *B60L 2240/423* (2013.01); *B60L 2240/486* (2013.01); *F16C 3/06* (2013.01); *H01R 39/08* (2013.01)

(58) Field of Classification Search
None
See application file for complete search history.

(56) References Cited

U.S. PATENT DOCUMENTS

| | | | |
|---|---|---|---|
| 6,439,065 B1 | 8/2002 | Ooshima et al. | |
| 9,413,128 B2 * | 8/2016 | Tien | H01R 13/52 |
| 9,616,968 B1 * | 4/2017 | Hu | H02K 11/21 |
| 9,921,118 B2 * | 3/2018 | Lull | A63B 24/0087 |

(Continued)

FOREIGN PATENT DOCUMENTS

| | | |
|---|---|---|
| CN | ZL201620514155.1 | 12/2016 |
| CN | ZL201621325222.1 | 7/2017 |
| EP | 2869048 A1 | 5/2015 |

OTHER PUBLICATIONS

The International Search Report and Written Opinion rendered by the International Searching Authority for PCT/US18/19584, dated May 25, 2018, 9 pages.

*Primary Examiner* — Joseph M Rocca
*Assistant Examiner* — Harold Eric Pahlck, III
(74) *Attorney, Agent, or Firm* — Skaar Ulbrich Macari, P.A.

(57) ABSTRACT

The bike's crank speed and crank position are sensed via a micro controller, torque sensor, gyro and accelerator disposed on the bike's crank. External power and control signals can be passed to and from the crank micro controller and the e-bike controller through a throttle connector of the e-bike controller via slip rings around the crank hub with and with pogo pin connectors connected to the respective slip rings. Throttle data can also be provided to the e-bike controller wirelessly via a wireless dongle coupled to the throttle connector of e-bike controller.

20 Claims, 5 Drawing Sheets

(56) References Cited

U.S. PATENT DOCUMENTS

| | | |
|---|---|---|
| 10,060,738 B2* | 8/2018 | Fyfe .................. G01L 5/162 |
| 2004/0084238 A1 | 5/2004 | Yokotani et al. |
| 2009/0120210 A1* | 5/2009 | Phillips ............. G01L 3/1457 |
| | | 73/862.338 |
| 2010/0024590 A1 | 2/2010 | ONeill et al. |
| 2015/0203172 A1* | 7/2015 | Huang ............... G01D 5/2451 |
| | | 180/206.3 |
| 2016/0052583 A1 | 2/2016 | Sasaki |
| 2016/0159434 A1 | 6/2016 | Huang et al. |
| 2017/0248420 A1* | 8/2017 | Fyfe .................. G01L 5/162 |
| 2018/0029666 A1* | 2/2018 | Shahana ............. B62M 6/50 |
| 2018/0050761 A1* | 2/2018 | Tsuchizawa ......... B60L 15/20 |
| 2018/0268668 A1* | 9/2018 | Tetsuka .............. G01C 9/06 |

* cited by examiner

SMART CRANK CONTROL FOR E-BIKE

PRIORITY

This application claims the priority benefit of U.S. Provisional Application No. 62/567,391 filed on Oct. 3, 2017, which is hereby incorporated herein by reference in its entirety.

FIELD

The present invention relates generally to electrical bicycles (e-bikes), and more particularly, to a smart crank control coupled to the throttle control of the e-bike.

BACKGROUND

Conventional e-bike motor output power control is based on an input to the motor controller of the degree of rotation of the hand throttle, which is moved by the rider. This functions satisfactorily where the e-bike is solely or primarily powered by the electric motor. But a hand throttle is difficult to operate when the electric motor is configured to merely assist the rider in pedaling.

In some regions, like Europe, motor power is treated as an assisting power—PAS (Pedal Assist System)—to help the person ride the e-bike more easily, and not the primary means of powering the bike. The PAS is merely an electric motor assist to the rider, so PAS is used to make riding the e-bike more like a regular bike.

In PAS systems, if biker does not pedal, the motor does not generate any output power. Speed PAS is based on biker's pedaling speed. When e-bike goes uphill, the e-bike rider will need more power from the electric motor, but they cannot get that power from a Speed PAS system because their pedaling speed is slower due to going uphill. Therefore, a torque sensor PAS system is required to sense the rider's pedaling power, so that the control system can control the motor's output power appropriately.

However, if rider's two legs stand on both pedals, the torque force will be very high. In this situation, it would be dangerous for the assist motor to generate its highest power. Therefore, the bike's crank speed and crank position need to be taken into account for safely and effectively controlling the assist motor for the bike.

Providing torque and crank position data to the motor controller is a challenge. A wireless transmission means can be used. However, not all of the e-bike controllers on the market have wireless receivers. Providing an aftermarket wireless receiver for the motor controller is not a satisfactory solution either since it would require the manufacturer or rider to modify their e-bike controller hardware and software to talk to the aftermarket wireless receiver. That requires additional cost and time to adapt the motor controller to an aftermarket wireless system for receiving the torque and crank position data. Most of e-bike manufacturers are not willing to take extra steps to modify their e-bike controller hardware and software.

Another issue is that torque sensors alone are not good enough to make a torque PAS because it is necessary to detect the exact crank position to send the right control signals to control e-bike controller. Some torque sensor PAS vendors put torque sensing component(s) on pedal axle to sense the twisting power caused by both legs. But this makes it difficult to sense the crank positions and the rider's intention cannot be easily discerned. For example, reverse pedaling means the rider wants to brake; both cranks in parallel to ground position means biker is resting and the motor can adjust its power output correspondingly; when left crank is at the lowest position and right crank in upper position, the crank can detect that the rider is in a dismounting position so that motor can adjust accordingly, and so on.

Further, powering the crank sensors presents difficulties. To avoid twisting wires caused by moving crank, adding a battery on the crank itself is one way to provide power. But battery life limits the use of the smart crank system. Recharging or replacing batteries is inconvenient and can be expensive.

Therefore, there remains a need to provide an improved electric power assist for e-bikes without extra efforts to modify the e-bike controller. There is also a need to provide smart crank control for e-bikes.

SUMMARY

The present invention addresses the above-noted drawbacks of torque pedal assist systems. The invention senses the bike's crank speed and crank position via a micro controller, torque sensor, gyro and accelerator on the bike's crank. In certain embodiments, external power and control signals are passed to and from the micro controller and the e-bike controller through a throttle connector via slip rings around the crank with pogo pins connected to respective slip rings. Alternatively, the sensor data can be provided to the e-bike controller wirelessly via a wireless dongle coupled to the throttle connector of e-bike controller.

The disclosure includes a smart crank control system for an e-bike, comprising a strain gauge disposed on the crank, a control board disposed on the crank and coupled to the strain gauge, the control board including gyro and accelerator motion sensors and a digital motion processor, and a slip ring disposed about the crank to provide for a power connection to the control board. The control board is coupled to the e-bike controller through the throttle connector of the e-bike.

The micro controller can be configured to determine a crank speed, a crank position and a torque data for the crank of the e-bike and report the crank speed, the crank position and the torque data to the e-bike controller via connection to the throttle connector. The control board can include a digital to analog converter coupled to the micro controller so that the crank speed, the crank position and the torque data for the crank of the e-bike are converted to analog throttle data for the throttle control.

The control board is coupled to the e-bike controller through the throttle connector of the e-bike via a cable or wirelessly. If wireless, the control board 106 can further include a wireless transceiver. A wireless transceiver dongle can be coupled to the e-bike controller through the throttle connector of the e-bike via a wire. The control board is then wirelessly connected to the wireless transceiver dongle. The wireless transceiver dongle can include a digital to analog converter so that a crank speed, a crank position and a torque data for the crank of the e-bike, if received in digital format, can be outputted as throttle data to the e-bike controller through throttle connector in an analog format. The e-bike controller can include a serial port wherein the wireless transceiver dongle is connected via the wire connection.

Pogo pin connectors can be coupled to the slip rings. A power input cable can be connected to the pogo pin connectors to supply power to the control board. A first end of a data cable can additionally or alternatively be connected to the pogo pin connectors. An opposing second end of the power or data cable can be connected to the throttle connector of the e-bike controller.

The disclosure also includes a method of providing electrical assistance to the rider of an e-bike. A torque data from a strain gauge disposed on a crank of the e-bike is determined by a smart crank controller. A crank speed from gyro and accelerator motion sensors and a digital motion processor provided to the crank of the e-bike is determined by a smart crank controller. A crank position from the digital motion processor provided to the crank of the e-bike is also determined by a smart crank controller. The pedaling force for the rider is determined. A data signal containing throttle data is passed through slip rings disposed around an axle of the crank of the e-bike. The data signal containing the throttle data is then passed to an e-bike controller through a throttle connector of the e-bike controller.

A first end of a data cable can be connected to the slip rings via a pogo pin connector and a second end of the data cable can be connected to the e-bike controller through the throttle connector. The torque data, crank speed and crank position can be used by the smart crank and transmitted as throttle data via a wire connection, or a wireless transceiver dongle. The throttle data communicated to the e-bike controller through throttle connector can be an analog signal.

The smart crank system can also determine whether a rider of the e-bike is reverse pedaling, whether a rider of the e-bike is resting with both cranks of the e-bike parallel to the ground, and whether the crank of the e-bike is in a dismount position. These determinations can be communicated to the e-bike controller through the throttle connector.

The disclosure further includes an e-bike. The e-bike includes a crank, an electric motor, an e-bike controller connected to the electric motor, a strain gauge disposed on the crank, a control board disposed on the crank and coupled to the strain gauge, and a slip ring disposed about the crank to provide for a rotational power coupling. The control board includes a gyro sensor, an acceleration motion sensor and a digital motion processor. The control board is coupled to the e-bike controller through the throttle connector via the plurality of slip rings and a conduit extending between the plurality of slip rings and the throttle connector of the e-bike.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
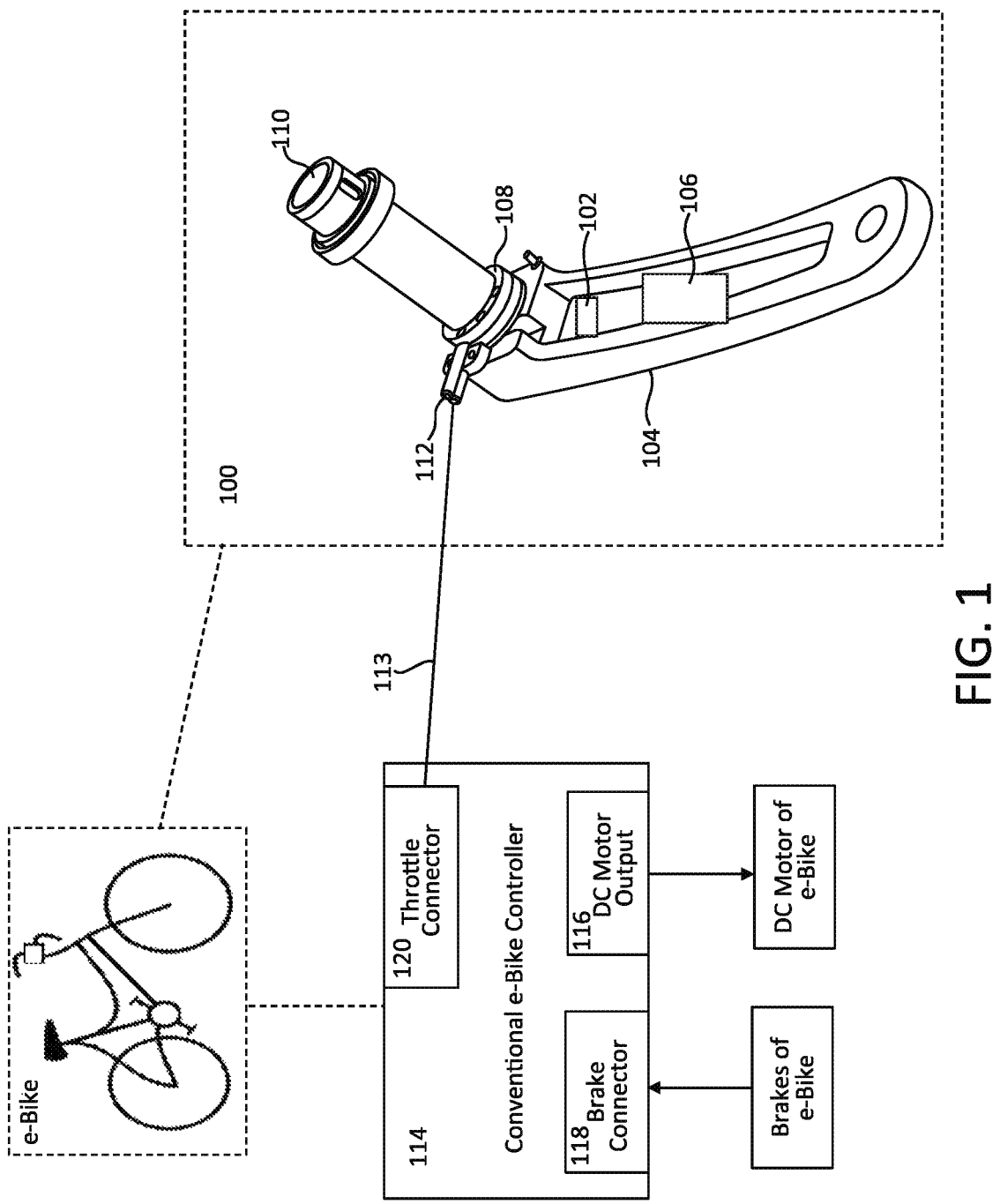
FIG. 1 is a diagram of a smart crank sensor system in accordance with certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIG. 1, the smart crank sensor system 100 for an e-bike includes a strain gauge 102 disposed on the crank 104 of the e-bike. A control board 106 is also disposed on the crank 104.

The control board 106 includes a micro controller and physical memory. Software code is stored in the memory and executed by the micro controller in order to control the operation of the smart crank system 100.

The control board 106 also includes motion sensors such as a gyro and accelerometer, and a digital motion processor. The motion sensors provide the crank speed and position data to the digital motion processor on the control board 106.

The strain gauge 102 is coupled to the control board 106. The strain gauge senses the strain in the crank that allows the micro controller on the board 106 to determine the torque data and the pedaling force of the e-bike rider.

A plurality of slip rings 108 are disposed around the pedal axle 110 of the e-bike (to which the crank 104 is connected). Pogo pin connectors 112 are disposed on the slip rings 108. Two of the slip rings 108 allow electrical power connection (Vcc and Gnd) to pass to the control board 106 while disposed on the rotating crank 104. Another slip ring 108 can be used to pass an analog throttle data signal from the control board out to a cable 113 that connects to the throttle connector of the e-bike controller 114.

The pogo pins 112 provide a convenient means for connecting electrical power and signal conduits such as wires or data cables. Other types of connectors can also be utilized.

In the embodiment shown in FIG. 1, the pogo pin connectors 112 are fixed to the frame of the e-bike. However, as will be explained with respect to FIGS. 4-7, the reverse situation can also be provided where the slip rings are fixed to the crank. The pogo pin connectors 112 and slip rings 108 thus function to provide an electrical pathway between the rotating crank 104 to a stationary location on the e-bike.

More or fewer slip rings can also be employed depending on how the system is configured in certain embodiments. For example, the data slip ring can be eliminated by passing the throttle data signals through the same path as the electrical power, or by making the signal transmission means wireless. The number of pogo pins connectors is varied accordingly. It is also contemplated that a single slip ring and pogo pin connector can be utilized in certain embodiments.

The e-bike includes a conventional e-bike controller 114 that is coupled to the main battery and the drive motor via the DC Motor output 116. A bike brake input 118 is also supplied to the e-bike controller 114 so that the controller 114 knows when the rider applies their brakes.

The data output from the smart crank system 100 is received into the conventional e-bike controller 116 via the controller's throttle connector 120. Conventional e-bike controllers are configured to receive analog data input. Therefore, the controller 106 of the smart crank system 100 is configured to output throttle data as an analog signal. A digital-to-analog (D/A) converter can be included on the control board 106 for this purpose. The D/A converter can be included as part of the micro controller.

The throttle data can be in various forms. For example, the throttle data can be an analog output representing a throttle magnitude value for the e-bike controller. The throttle data can also be more complex, so that certain determined values, such as crank speed, crank position, crank torque, etc. are communicated to the e-bike controller.

The smart crank system can sense the torque of e-bike rider's pedaling force via the strain gauge 102. The smart crank micro controller can also calculate the speed and position of the crank based upon the motion sensor readings evaluated by the digital motion processor on the board 106. The motion sensors and digital motion processor can also be disposed on the crank separate from the board 106 and electrically coupled to the board 106.

The smart crank system can determine a total pedaling force of the rider based upon the measured pedaling force and crank position data. A crank angle defined between the horizontal plane and the longitudinal axis of the crank can be determined based upon the motion sensors and digital motion processor data. The measured pedaling force based upon the strain gauge data is multiplied by the cosine of the crank angle to determine the total pedaling force being exerted by the rider. Thus, the total pedaling force that is the combined force vector components in the vertical and horizontal planes can be computed. The total pedaling force can be used for computing the throttle data signal since it is more representative of the rider's applied pedaling power than the measured pedaling force based upon the strain gauge data.

The smart crank system 100 can also determine from the crank position whether the rider is braking, dismounting, resting, etc., and relay this determination to the e-bike controller 114.

The smart crank system 100 does not need a separate power source because it can be powered from e-bike controller 114 through the slip rings 108 and pogo pins 112. Alternatively, power can be supplied directly from the e-bike's main battery that is used to power the drive motor.

The smart crank system 100 can be retrofitted to existing e-bikes because the system 100 can interface with any existing e-bike through the convention throttle connector.

This smart crank system 100 can be applied to a variety of electrically-powered conveyances, including bicycles, monocycles, tricycles, wheelchairs, recumbent bicycles, exercise machines, etc., where the conveyance requires the rider to operate a leg or hand operated crank/handle. The power applied to crank/handle by the operator is thus used to decide the drive motor power output.

The invention can also be configured as an e-bike featuring the smart crank system disclosed herein.

Figure 2:
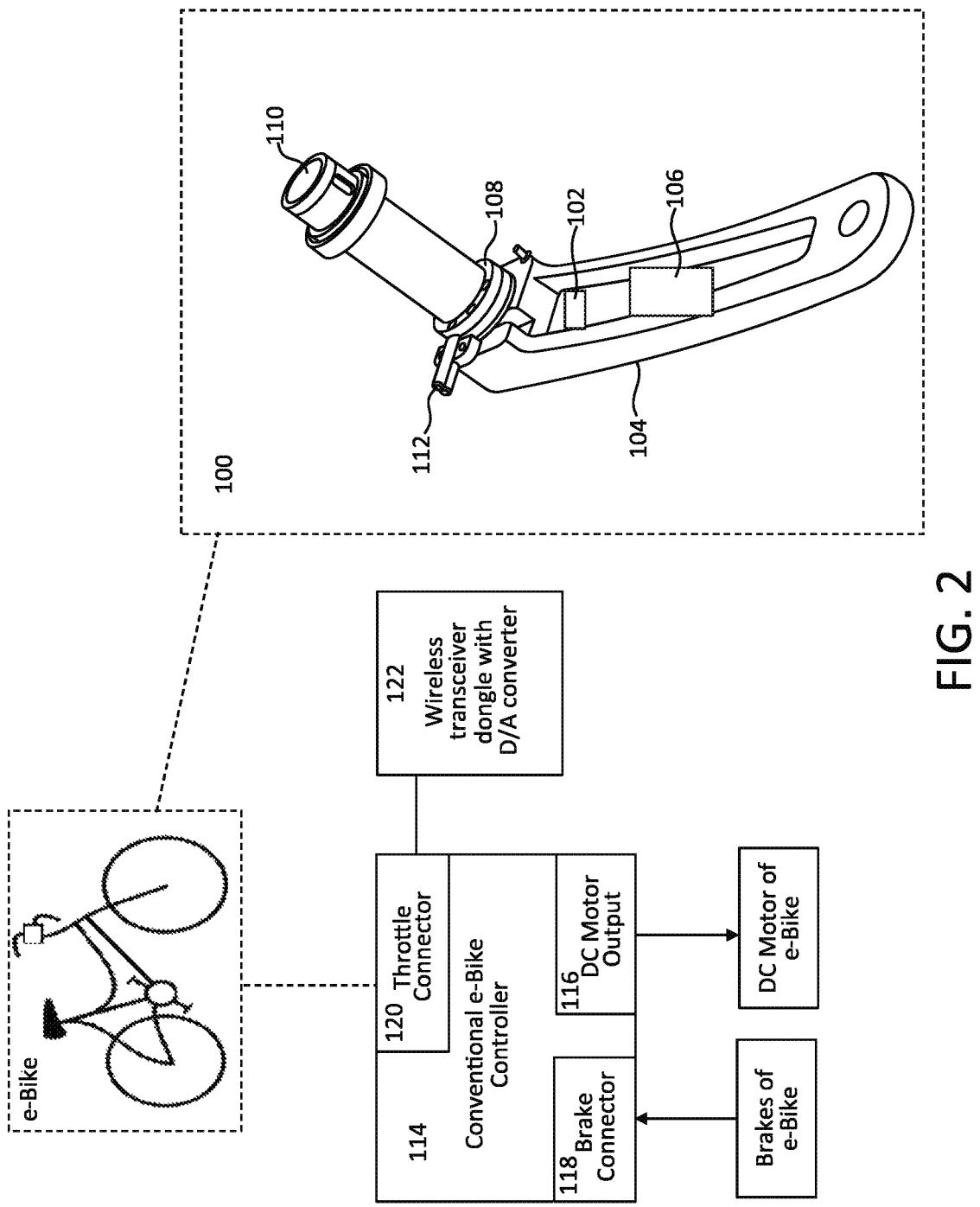
FIG. 2 is another diagram of a smart crank sensor system in accordance with certain embodiments.

Referring to FIG. 2, the output of the control board can be wirelessly coupled to the e-bike controller 114 wirelessly via a wireless transceiver dongle 122. The board in this embodiment additionally includes a wireless transceiver to transmit the output data, which is then received by a wireless dongle 122 that is electrically coupled to the e-bike controller 114. The output from the board 106 can be digital, so a digital to analog converter is included in the dongle 122 to convert the data signals to analog for use by the e-bike controller 114. The wireless transmission means can be Bluetooth, Wi-Fi, ZigBee, cellular, radio frequency, or any other wireless transmission means.

Figure 3:
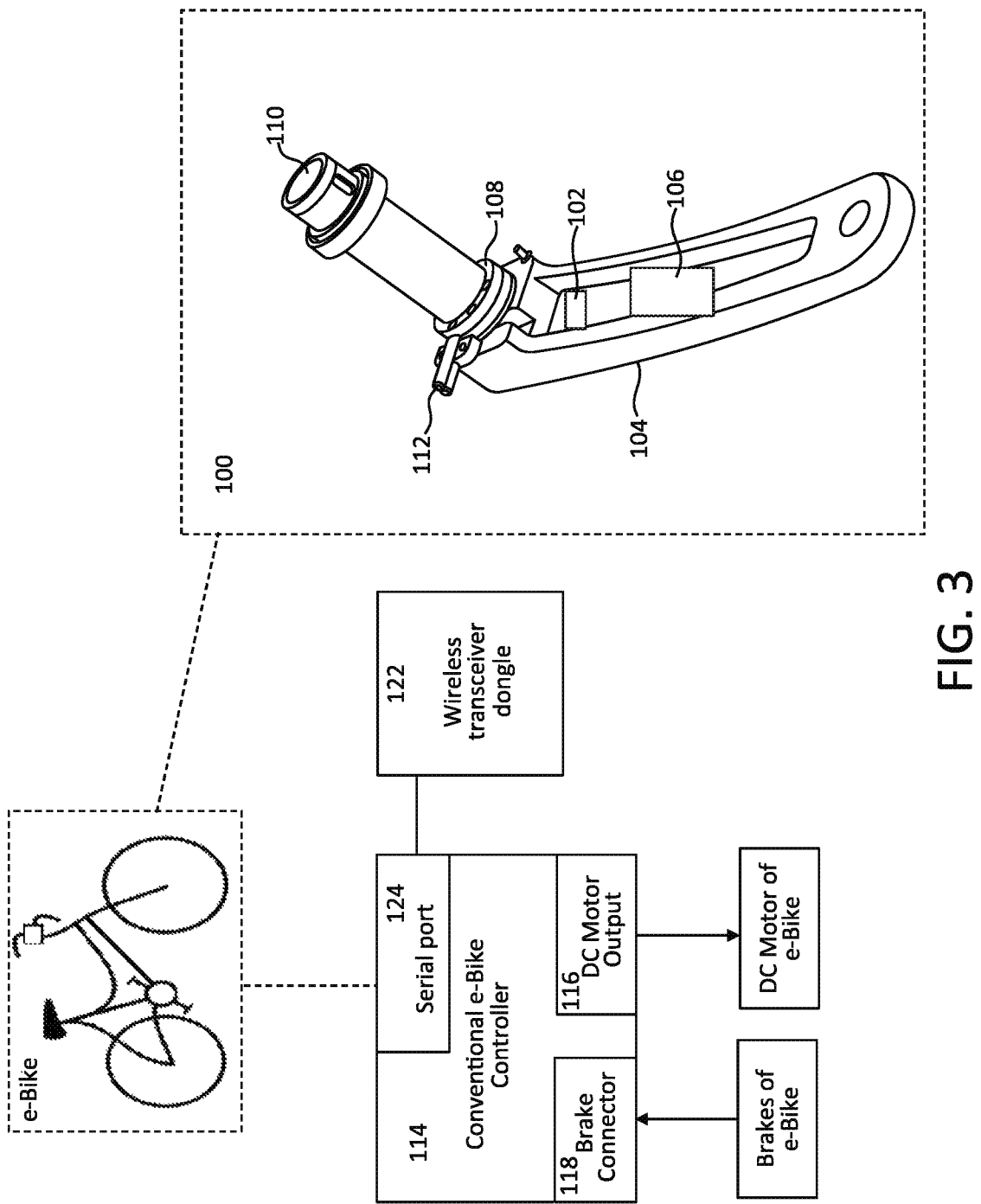
FIG. 3 is a further diagram of a smart crank sensor system in accordance with certain embodiments.
Figure 4:
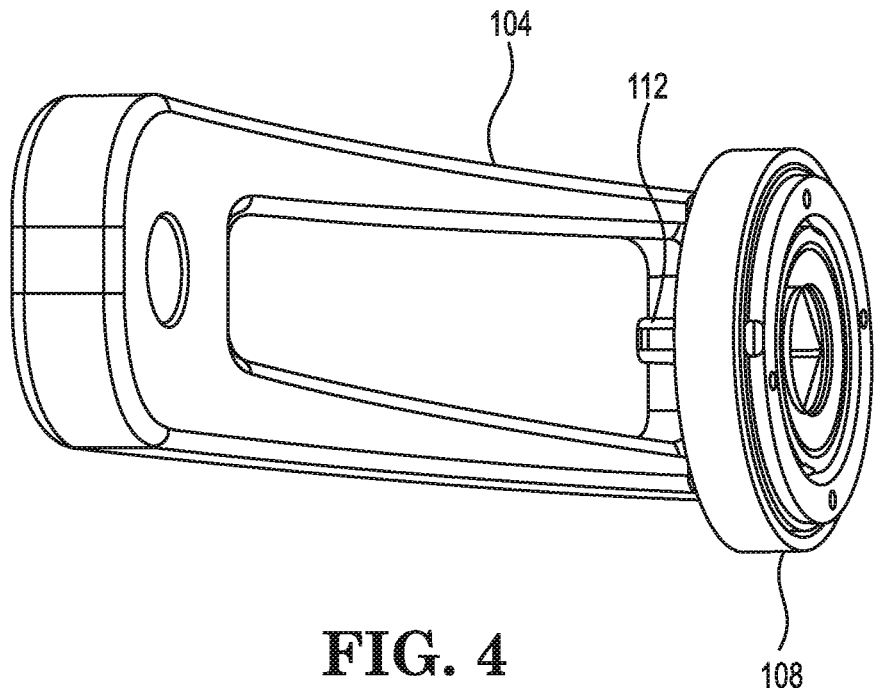
FIG. 4 is a perspective view of a crank with slip rings for a smart crank sensor system in accordance with certain embodiments.
Figure 5:
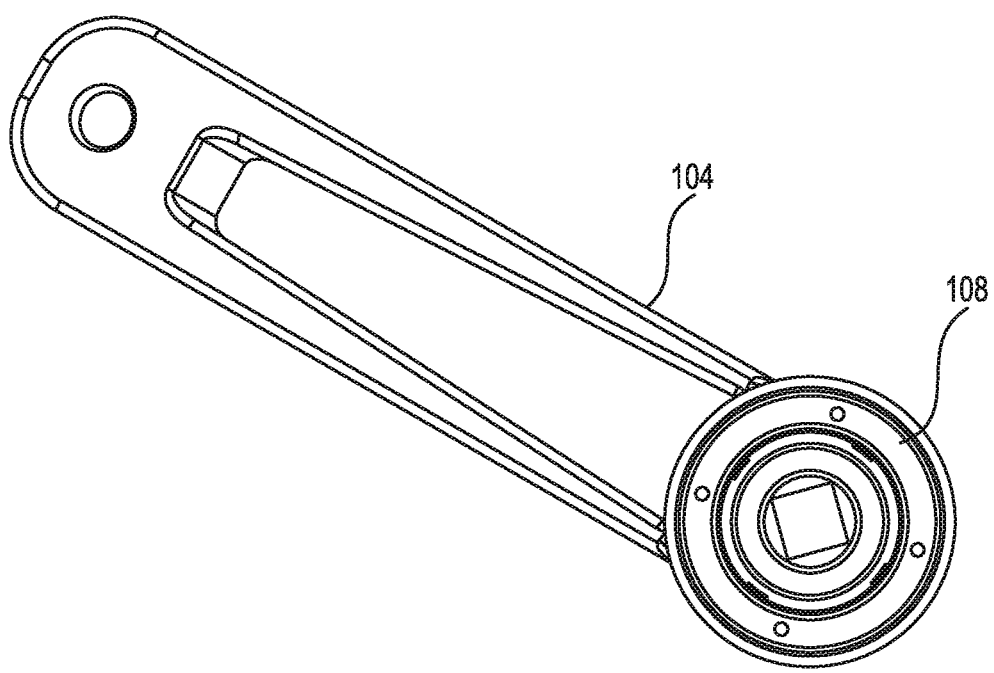
FIG. 5 is an inner side view of a crank with slip rings for a smart crank sensor system in accordance with certain embodiments.
Figure 6:
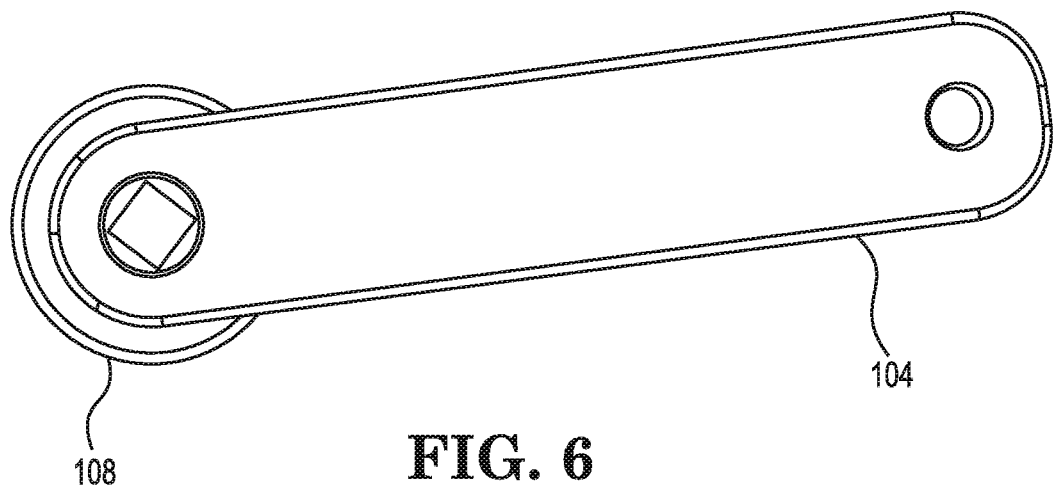
FIG. 6 is an outer side view of a crank with slip rings for a smart crank sensor system in accordance with certain embodiments.
Figure 7:
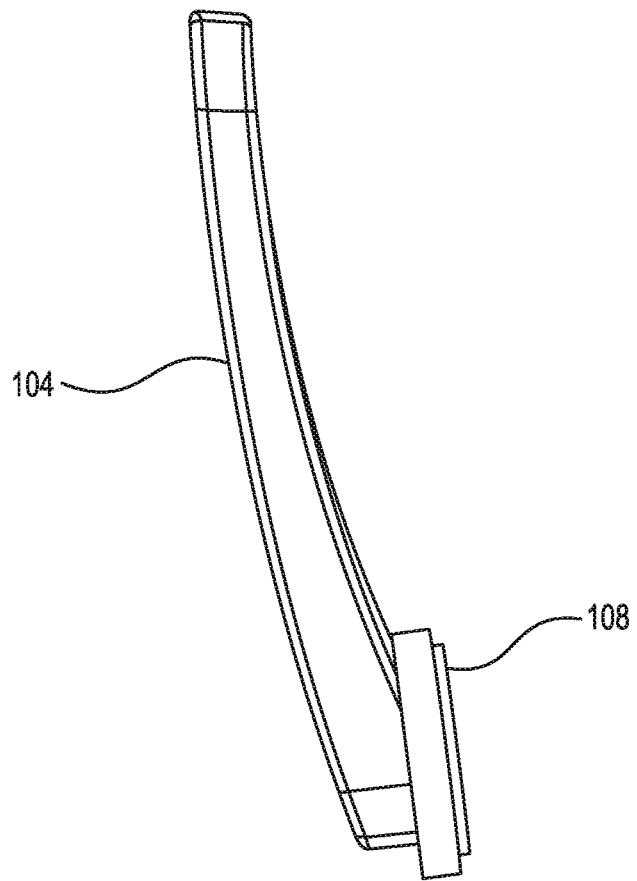
FIG. 7 is a top view of a crank with slip rings for a smart crank sensor system in accordance with certain embodiments.

Referring to FIG. 3, the e-bike controller 114 includes a serial port 124, such as a universal asynchronous receiver-transmitter (UART) port. In this embodiment, the wireless dongle 122 connects to the serial port 122 and the dongle no longer needs to include the D/A converter. Other input types of input ports can alternatively be provided, including universal serial bus (USB) ports. It may be necessary to update the software code for the e-bike controller 114 if the controller does not support the data output protocols used by the micro controller on the smart crank board 106.

Referring to FIGS. 4-7, the crank 104 is shown. The slip ring 108 is disposed around the crank 108 while the pogo pin connector 112 rotates about the pedal axle 110 (in FIG. 1). The pedal (not shown) is disposed on the opposing end of the crank 104. The slip rings 108 and pogo pin connectors 112 permit the electrical signals and/or power to be transmitted through the rotating crank without binding up the wire cabling. In this embodiment, the wire 113 shown in FIG. 1 would be connected to the slip ring 108 and the smart crank board 106 would be connected to the pogo pin connectors 112.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A smart crank control system for an e-bike, the e-bike including a crank and an electric motor connected to an e-bike controller, the e-bike controller including a throttle connector, the smart crank system comprising:
   a strain gauge disposed on the crank;
   a control board disposed on the crank and coupled to the strain gauge, the control board including a motion sensor, a digital motion processor and a micro controller; and
   a plurality of slip rings disposed about the crank to provide for a power connection to the control board without interfering with rotation of the crank,
   wherein the control board is coupled to the e-bike controller through the throttle connector of the e-bike controller, and wherein the control board is configured to transmit to the e-bike controller an output in the form of a throttle magnitude value for the e-bike controller.

2. The smart crank system of claim 1, wherein the micro controller is configured to determine a crank speed, a crank position and a torque data for the crank of the e-bike and report a throttle data to the e-bike controller via the throttle connector.

3. The smart crank system of claim 2, wherein the micro controller includes a digital to analog converter so that the throttle data is outputted in an analog format.

4. The smart crank system of claim 1, wherein the control board is coupled to the throttle connector via a cable extending between the slip rings and the throttle connector.

5. The smart crank system of claim 1, wherein the control board is coupled to the throttle connector wirelessly.

6. The smart crank system of claim 5, wherein the control board further includes a wireless transceiver, and the smart crank system further includes a wireless transceiver dongle coupled to the throttle connector of the e-bike controller via a wire, wherein the control board is wirelessly connected to the wireless transceiver dongle.

7. The smart crank system of claim 6, wherein the wireless transceiver dongle includes a digital to analog converter so that a throttle data can be outputted to the e-bike controller in an analog format.

8. The smart crank system of claim 6, wherein the e-bike controller includes a serial port and the wireless transceiver dongle is connected to the e-bike controller via the wire connected to the serial port.

9. The smart crank system of claim 1, wherein the micro controller includes a digital to analog converter so that a throttle data is outputted in an analog format.

10. The smart crank system of claim 1, further comprising a plurality of pogo pin connectors, each coupled to a respective one of the plurality of slip rings.

11. The smart crank system of claim 10, wherein a power input cable is connected to an at least one of the plurality of pogo pin connectors.

12. The smart crank system of claim 10, wherein a first end of a data cable is connected to one of the plurality of pogo pin connectors.

13. The smart crank system of claim 12, wherein an opposing second end of the data cable is connected to the throttle connector of the e-bike controller.

14. A method of providing electrical pedal assistance to a rider of an e-bike, the method comprising:
    determining a torque data from a strain gauge disposed on a crank of the e-bike;
    determining a crank speed from a motion sensor and a digital motion processor provided to the crank of the e-bike;
    determining a crank position from the motion sensor and the digital motion processor provided to the crank of the e-bike;
    determining a total pedaling force value for the rider;
    passing a throttle data signal through a slip ring disposed around an axle of the crank of the e-bike; and
    communicating the throttle data signal to an e-bike controller through a throttle connector of the e-bike controller, wherein the throttle data signal is an output in the form of a throttle magnitude value for the e-bike controller.

15. The method of claim 14, further comprising connecting a first end of a data cable to the slip ring via a pogo pin connector and a second end of the data cable to the throttle connector of the e-bike controller.

16. The method of claim 14, wherein the throttle data signal is an analog data signal, and wherein the throttle data signal is determined based upon at least the total pedaling force value for the rider, the crank speed and the crank position.

17. The method of claim 14, further comprising determining whether the rider of the e-bike is reverse pedaling.

18. The method of claim 14, further comprising determining whether the rider of the e-bike is resting with both cranks of the e-bike parallel to the ground.

19. The method of claim 14, further comprising determining whether the crank of the e-bike is in a dismount position.

20. An e-bike, comprising:
    a crank;
    an electric motor;
    an e-bike controller connected to the electric motor, the e-bike controller including a throttle connector;
    a strain gauge disposed on the crank;
    a control board disposed on the crank and coupled to the strain gauge, the control board including a motion sensor and a digital motion processor; and
    a plurality of slip rings disposed about the crank that provide for a rotational power coupling for the control board,
    wherein the control board is coupled to the e-bike controller through the throttle connector via the plurality of slip rings and a conduit extending between the plurality of slip rings and the throttle connector of the e-bike, and
    wherein the control board is configured to transmit to the e-bike controller an output in the form of a throttle magnitude value for the e-bike controller.

* * * * *